(12) United States Patent
Zhang et al.

(10) Patent No.: US 10,932,619 B2
(45) Date of Patent: Mar. 2, 2021

(54) AIR-GUIDE MEMBER FOR AN APPARATUS USING AIR FLOW TO PREPARE FOOD INGREDIENTS

(71) Applicant: KONINKLIJKE PHILIPS N.V., Eindhoven (NL)

(72) Inventors: Mingshuo Zhang, Eindhoven (NL); Andreas Kowalewski, Eindhoven (NL); Claudio Brenna, Eindhoven (NL); Stefan Hans Sauer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 286 days.

(21) Appl. No.: 15/768,582

(22) PCT Filed: Oct. 31, 2016

(86) PCT No.: PCT/EP2016/076209
§ 371 (c)(1),
(2) Date: Apr. 16, 2018

(87) PCT Pub. No.: WO2017/076797
PCT Pub. Date: May 11, 2017

(65) Prior Publication Data
US 2018/0271323 A1    Sep. 27, 2018

(30) Foreign Application Priority Data
Nov. 2, 2015    (EP) ..................................... 15192497

(51) Int. Cl.
*A47J 37/06*    (2006.01)

(52) U.S. Cl.
CPC ................................. *A47J 37/0641* (2013.01)

(58) Field of Classification Search
CPC ......... A47J 37/0641; A47J 27/00; A47J 36/24
See application file for complete search history.

(56) References Cited

U.S. PATENT DOCUMENTS 9,854,941 B2 *    1/2018    Bonaccorso ........... A47J 37/128

FOREIGN PATENT DOCUMENTS

| CN | 203776718 U | 8/2014 |
|---|---|---|
| CN | 104490294 A | 4/2015 |
| WO | 2012032449 A1 | 3/2012 |
| WO | 2014195192 A1 | 12/2014 |

* cited by examiner

*Primary Examiner* — John C Hong

(57) ABSTRACT

An air-guide member (100) for guiding an air flow (AF) is provided for in a food preparation chamber of a cooking device that uses air flow (AF) to prepare food ingredients. The air-guide member (100) includes a plurality of air-deflecting arms (101) arranged symmetrically and extending in a horizontal plane (P) between an inner part (IP) and an outer part (OP) of the air-guide member (100). The air guide member configuration allows for directing the air flow upwards and more evenly between the outer part and the inner part of the air-guide. The food ingredients can thus receive a flow of hot air having a more uniform air pressure distribution, which results in a more even cooking of the food ingredients.

20 Claims, 12 Drawing Sheets

L-L

M-M

P-P

AIR-GUIDE MEMBER FOR AN APPARATUS USING AIR FLOW TO PREPARE FOOD INGREDIENTS

This application is the U.S. National Phase application under 35 U.S.C. § 371 of International Application No. PCT/EP2016/076209, filed on Oct. 31, 2016, which claims the benefit of International Application No. 15192497.4 filed on Nov. 2, 2015. These applications are hereby incorporated by reference herein.

FIELD OF THE INVENTION

The invention relates to an air-guide member for an apparatus using air flow to prepare food ingredients.

The invention also relates to an apparatus using this air-guide member.

The invention may be used in the field of food preparation, such as, for example, kitchen appliances.

BACKGROUND OF THE INVENTION

Air-based fryers are known apparatus for cooking food ingredients, for example for cooking vegetable (e.g. fries) or meat (e.g. chicken). With this type of appliance, the heat for preparing the food ingredients is provided by a flow of hot air circulated around the food ingredients. To facilitate hot air passes all the food ingredients placed in a food preparation chamber, some known apparatus use an air-guide member disposed in the bottom part of the food preparation chamber. Those known air-guide members direct the flow of hot air essentially upwards in the food preparation chamber. However, although those known air-guide members helps the air flow be directed towards the food ingredients, the cooking of food ingredients is not always optimized because it happens that food ingredients are cooked non-evenly, i.e. some food ingredients remain under-cooked. If the cooking duration is increased, some food ingredients might get over-cooked.

SUMMARY OF THE INVENTION

It is an object of the invention to propose an improved air-guide member that avoids or mitigates above-mentioned problems.

The invention is defined by the independent claims. The dependent claims define advantageous embodiments.

To this end, the invention proposes an air-guide member for guiding an air flow in the food preparation chamber of an apparatus using the air flow to prepare food ingredients. The air-guide member comprises:

a plurality of air-deflecting arms arranged symmetrically and extending in a horizontal plane between an inner part and an outer part of the air-guide member, the air-deflecting arms comprising a first surface being inclined with a positive angle compared to the horizontal plane, and a second surface being inclined with a negative angle compared to the horizontal plane, the air-deflecting arms being such that the second surface of a given air-deflecting arms and the first surface of an air-deflecting arms consecutive to the given air-deflecting arms intersect to form a concave air channel extending between the outer part and the inner part.

When an input air flow directing downwards and towards the outer part of the air-guide member, the concave air channel allows directing a portion of the input air flow towards the inner part of the air-guide member. As a result, each of the first surface receives an air flow component along its length that can be further redirected upwards thanks to the inclination of this first surface. This results in that not only the air flow is directed upwards, but also that air flowing upwards is evenly distributed between the outer part and the inner part of the air-guide member (as opposed to known air-guide member that mainly redirect air upwards in a region close to the outer part). The food ingredients can thus receive a flow of hot air having a more uniform air pressure distribution, which results in a more even cooking of the food ingredients.

Advantageously, the bottom part of the concave air channel has an elevation, compared to the horizontal plane, varying between the outer part and the inner part.

Having the elevation of the air channel varying between the outer part and the inner part contributes having the input air flow be smoothly directed towards the inner part, while minimizing the loss of air pressure.

Advantageously, the elevation increases towards the inner part. Having the elevation of the air channel increasing towards the inner part contributes to progressively redirect the air flow upwards before being further directed upwards by the first surface. This thus minimizes the variation of air pressure at the entrance of the first surface.

Advantageously, the elevation decreases towards the inner part.

Having the elevation of the air channel decreasing towards the inner part allows minimizing the loss of speed of the air flow at the entrance of the first surface. Moreover, this also allows collecting residue of fat (from food ingredients being cooked) in the inner part.

Advantageously, the elevation increases between the outer part and an intermediate area along the concave air channel, and decreases between the intermediate area and the inner part.

Having the elevation of the air channel increasing between the outer part and the intermediate area contributes to progressively redirect the air flow upwards before being further directed upwards by the first surface. This thus minimizes the variation of air pressure at the entrance of the first surface. Having the elevation decreasing near the inner part allows collecting residue of fat generated by the food ingredients because of the heating.

Advantageously, the vertical projection of the bottom part of the concave air channel on the horizontal plane defines a first portion with a circular curvature having a first radius in the range [30; 100] mm.

This range of value is particularly adapted when the air-guide member is used along with home-appliance apparatus having dimensions to fit in a user's kitchen environment.

Advantageously, the first surface and the second surface have a concave curvature facing opposite the horizontal plane.

Having a concave curvature for the first surface allows an improved redirection upwards of the air flow (as opposed to the first surface having an inclined flat area). Having a concave curvature for the second surface allows a smooth contact of an input air flow, which minimizes the loss of air speed and air pressure.

Advantageously, the span of the air-deflecting arms has a value in the range [80; 100]% of the length between the inner part and the outer part.

Having the air-deflecting arms with relatively wide span allows further improving an even distribution of air flowing upwards along a larger distance between the inner part and the outer part.

Advantageously, the air-deflecting arms converge to the inner part to form an upper extremity at the inner part having a width in the range [1; 3]% of the length between the inner part and the outer part.

Having the air-deflecting arms converging to form an upper extremity at the inner part allows that the air flow directed upwards by one air-deflecting arm does not interfere with the air flow directed upwards by a consecutive air-deflecting arm. The even distribution of air flowing upwards is thus guarantied along the total width of the air-guide member. The fact of having a relatively small width at the inner part contributes that air flowing upwards will be evenly distributed even in a region very close to the center of the air-guide member.

Advantageously, the air-guide member further comprises a curved portion surrounding the periphery of the outer part. The curved portion bends circularly upwards with a second radius r2 being in the range [10; 30] mm.

The curved portion allows an input air flow directing downwards and towards the outer part of the air-guide member keeping its speed and air pressure.

The invention also relates to an apparatus for preparing food ingredients. The apparatus comprises:
  a food preparation chamber,
  a food basket disposed within the food preparation chamber to receive the food ingredients, the food basket comprising an air-permeable bottom part,
  a fan for circulating an air flow inside the apparatus,
  a heating unit for heating the air flow,
  an air-guide member as claimed in any preceding claims, the air-guide member being disposed below the air-permeable bottom part for guiding the air flow upwards in the food basket.

When the air-guide member according to the invention is implemented in this type of apparatus, the food ingredients are more evenly cooked.

Advantageously, the apparatus comprises a drawer removably detachable from the food preparation chamber. The drawer is adapted to hold the food basket thereinto. The drawer comprises a bottom part formed by the air-guide member.

Having the air-guide member integral with the drawer forms a cost-effective solution for manufacturing the drawer and the air-guide member.

Advantageously, the apparatus comprises a drawer removably detachable from the food preparation chamber. The drawer is adapted to hold the food basket thereinto. The drawer has a bottom part on which the air-guide member is disposed and is removably detachable from.

Having the air-guide member removably detachable from the drawer allows an easy cleaning of the apparatus and the air-guide member after the preparation of the food ingredients is finished.

Advantageously, the drawer has vertical walls abutting tangentially the curved portion.

When the drawer has vertical walls abutting tangentially the curved portion situated at the outer part of the air-guide member, this allows having a smooth contact of an input air flow with the air-guide member, which minimizes the loss of air speed and air pressure.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
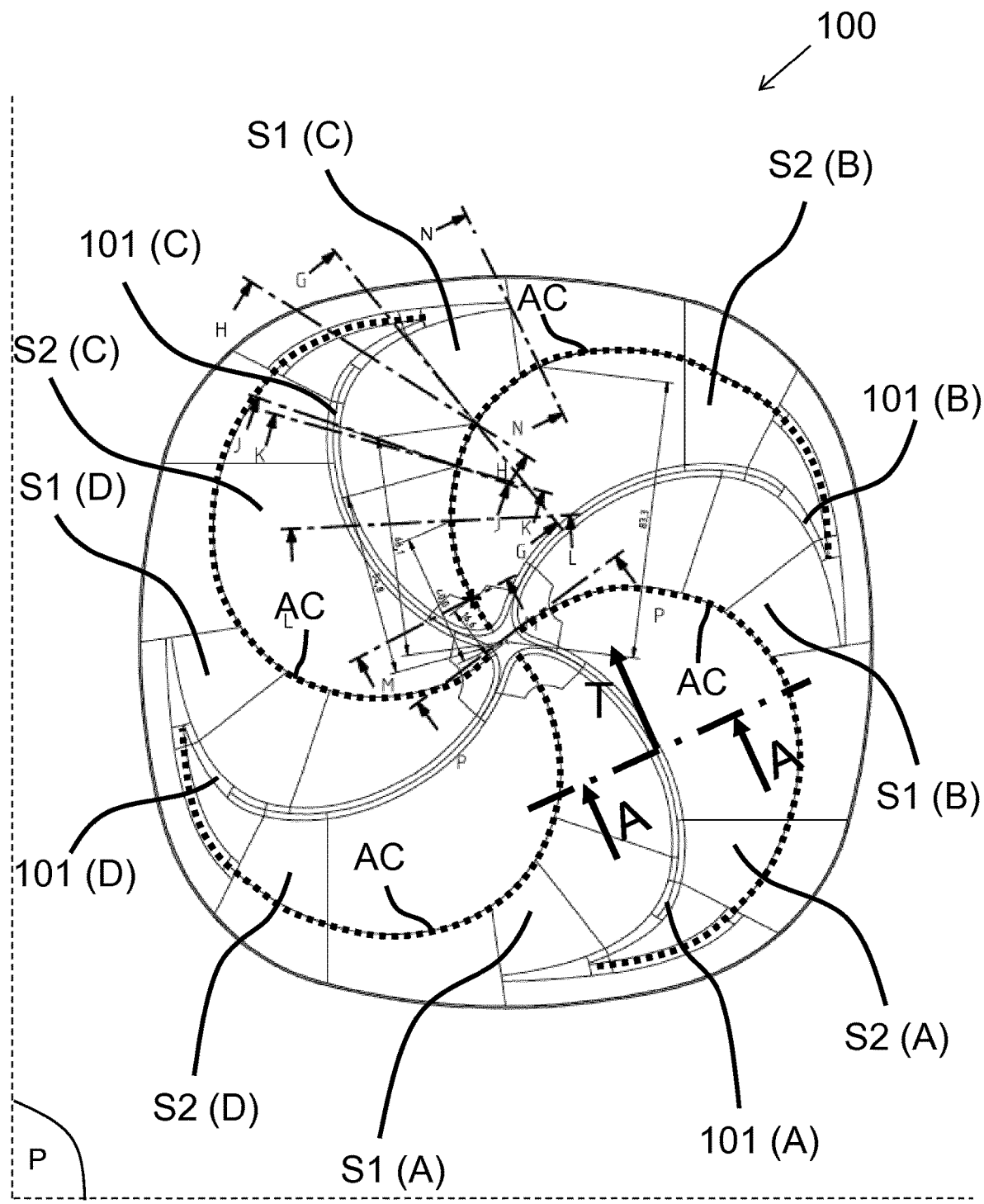
FIG. 1 depicts a top view of an air-guide member according to the invention.

FIG. 1 depicts a top view of an air-guide member 100 according to the invention. The air-guide member 100 is for guiding an air flow AF in the food preparation chamber of an apparatus using the air flow AF to prepare food ingredients F.

The air-guide member 100 comprises a plurality of air-deflecting arms 101 arranged symmetrically and extending in a horizontal plane P between an inner part IP and an outer part OP of the air-guide member 100. In the present example, four deflecting arms 101 (A), 101 (B), 101 (C) and 101 (D) are represented, arranged every 360/4=90 degrees. Preferably, the inner part IP corresponds to the center of the air-guide member. If the air-guide member is circular-shape, the inner part is the center of the corresponding circle. The outer part OP corresponds to the outer extremity of the air-guide member. More generally, a number of at least two air-deflecting arms 101 can similarly be arranged.

The air-deflecting arms 101 also comprise a first surface S1 being inclined with a positive angle a1 compared to the horizontal plane P, and a second surface S2 being inclined with a negative angle a2 compared to the horizontal plane P. In the present example, the four deflecting arms 101 (A), 101

(B), 101 (C) and 101 (D) have first surface S1 (A), S1 (B), S1 (C) and S1 (D), respectively, and have second surface S2 (A), S2 (B), S2 (C) and S2 (D), respectively.

The air-deflecting arms 101 are such that the second surface S2 of a given air-deflecting arm 101 and the first surface S1 of an air-deflecting arm 101 consecutive to the given air-deflecting arms 101 intersect to form a concave air channel AC extending between the outer part OP and the inner part IP. In the present example, with four deflecting arms 101 (A), 101 (B), 101 (C) and 101 (D), the first surface S1 (A), S1 (B), S1 (C) and S1 (D) intersect with the second surface S2 (D), S2 (A), S2 (B) and S2 (C), respectively, to form four separate concave air channels AC. For sake of clarity, the concave air channels AC are represented with dotted lines.

Figure 3A:
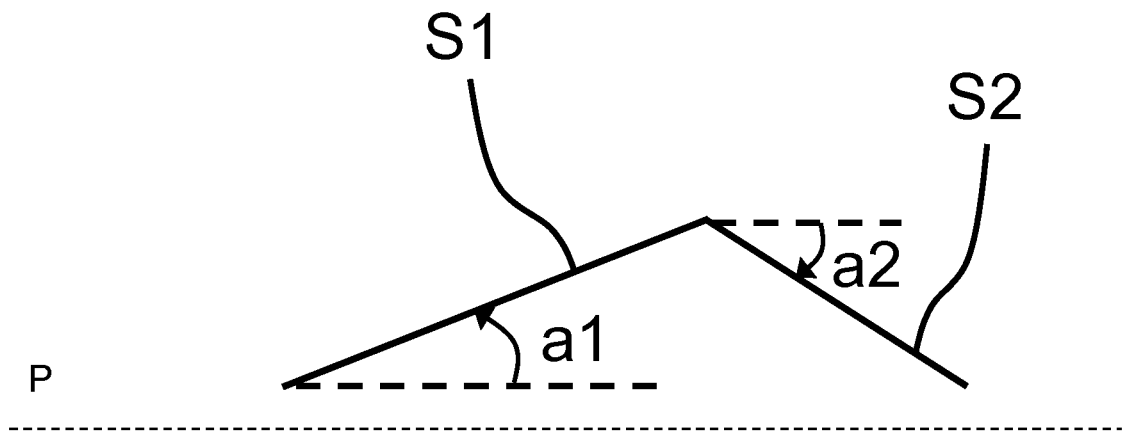
FIG. 3A depicts a vertical cross-section view of a first embodiment of air-deflecting arms used in an air-guide member according to the invention.

The positive angle a1 compared to the horizontal plane P, and the negative angle a2 compared to the horizontal plane P are illustrated in FIG. 3A, which depicts a vertical cross-section view A-A of a first embodiment of an air-deflecting arm used in an air-guide member according to the invention. The vertical cross-section view A-A is taken perpendicularly compared to a tangential direction T of a top edge of the air-deflecting arms 101, as illustrated in FIG. 1. For example, the absolute value of the positive angle a1 and the negative angle a2 is in the range [10; 60] degrees compared to the horizontal plane P.

Figure 2A:
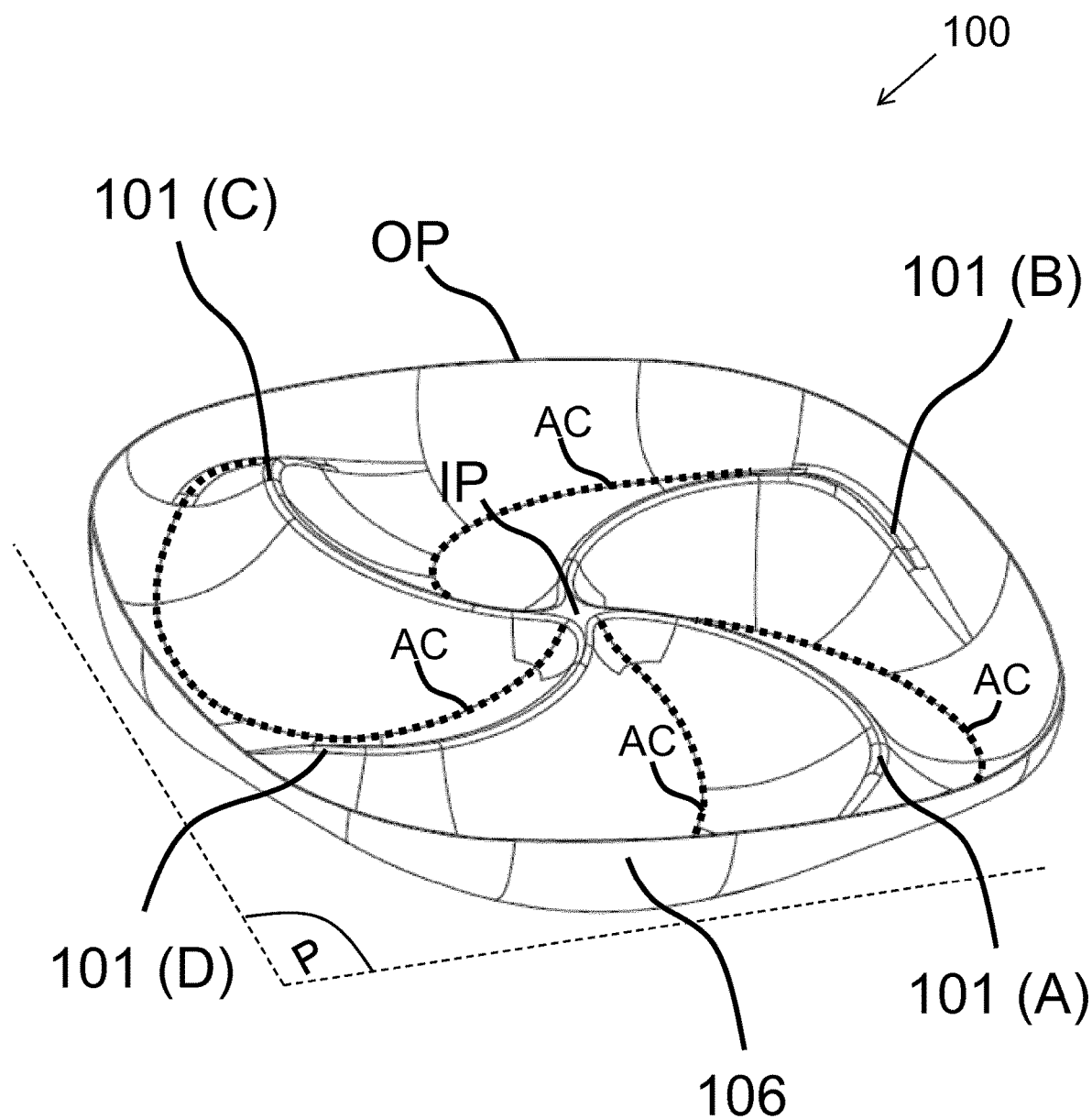
FIG. 2A depicts a three-dimensional view of an air-guide member according to the invention.
Figure 5A:
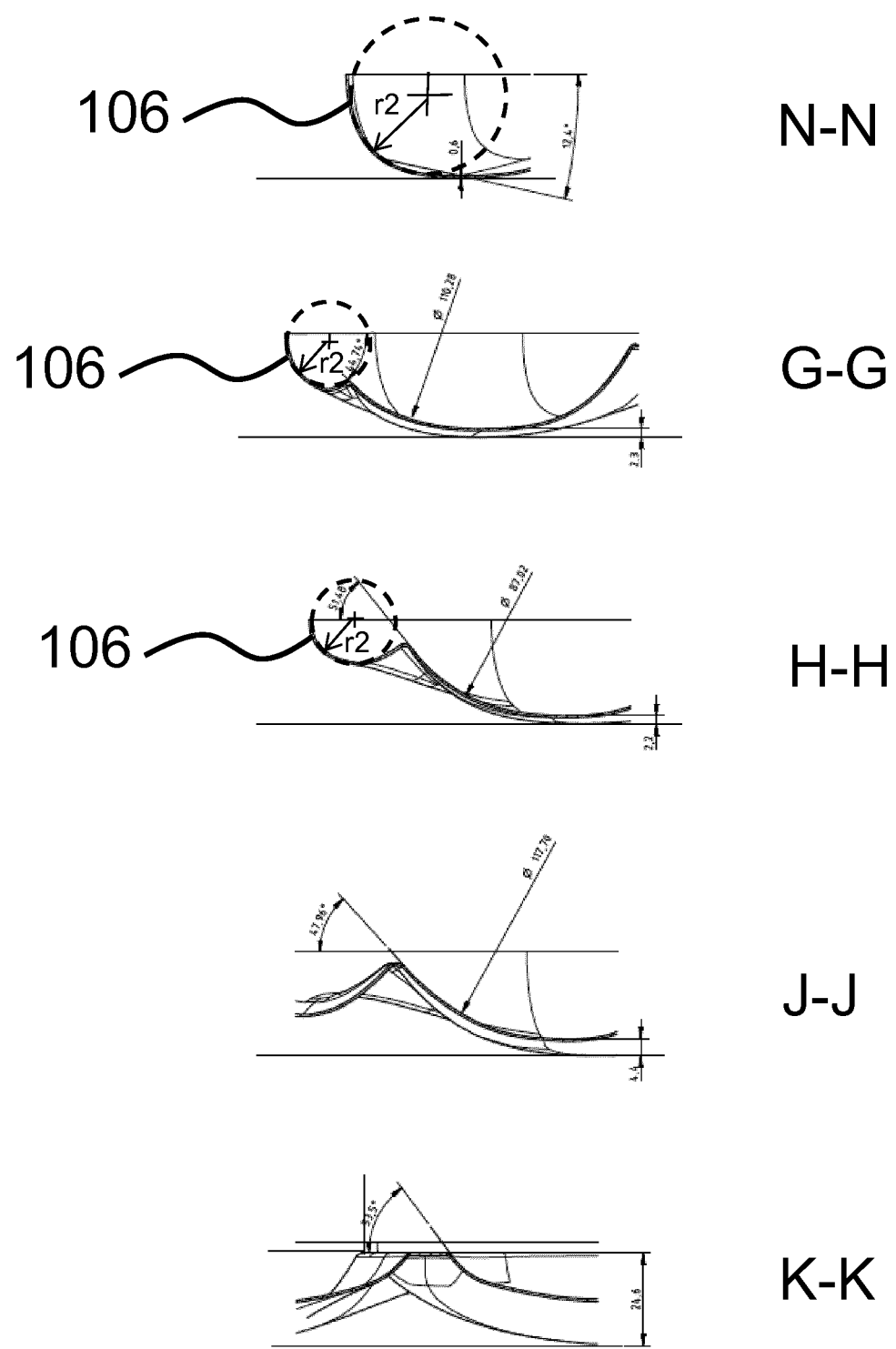
FIG. 5A and FIG. 5B depict various vertical cross-section views of an air-guide member according to the invention as illustrated in FIG. 1.
Figure 5B:
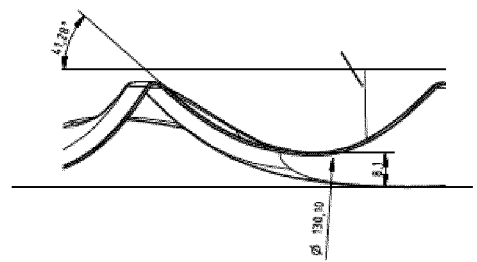
Figure 5B:
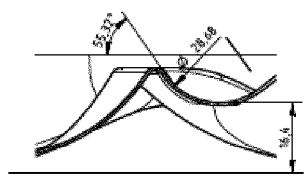
Figure 5B:
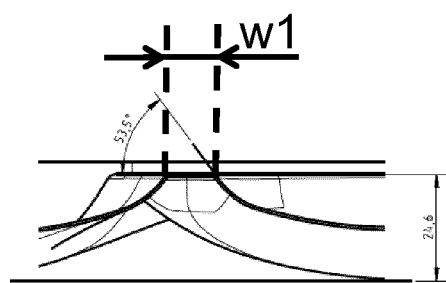

FIG. 2A depicts a three-dimensional view of an air-guide member according to the invention. It can be seen that the concave air channel AC extending between the outer part OP and the inner part IP takes the shape of a rill (i.e. a furrow, a gutter). The shape of the concave air channel AC can also be appreciated on FIG. 5A and FIG. 5B, which depict various vertical cross-section views of an air-guide member according to the invention as illustrated in FIG. 1.

Figure 2B:
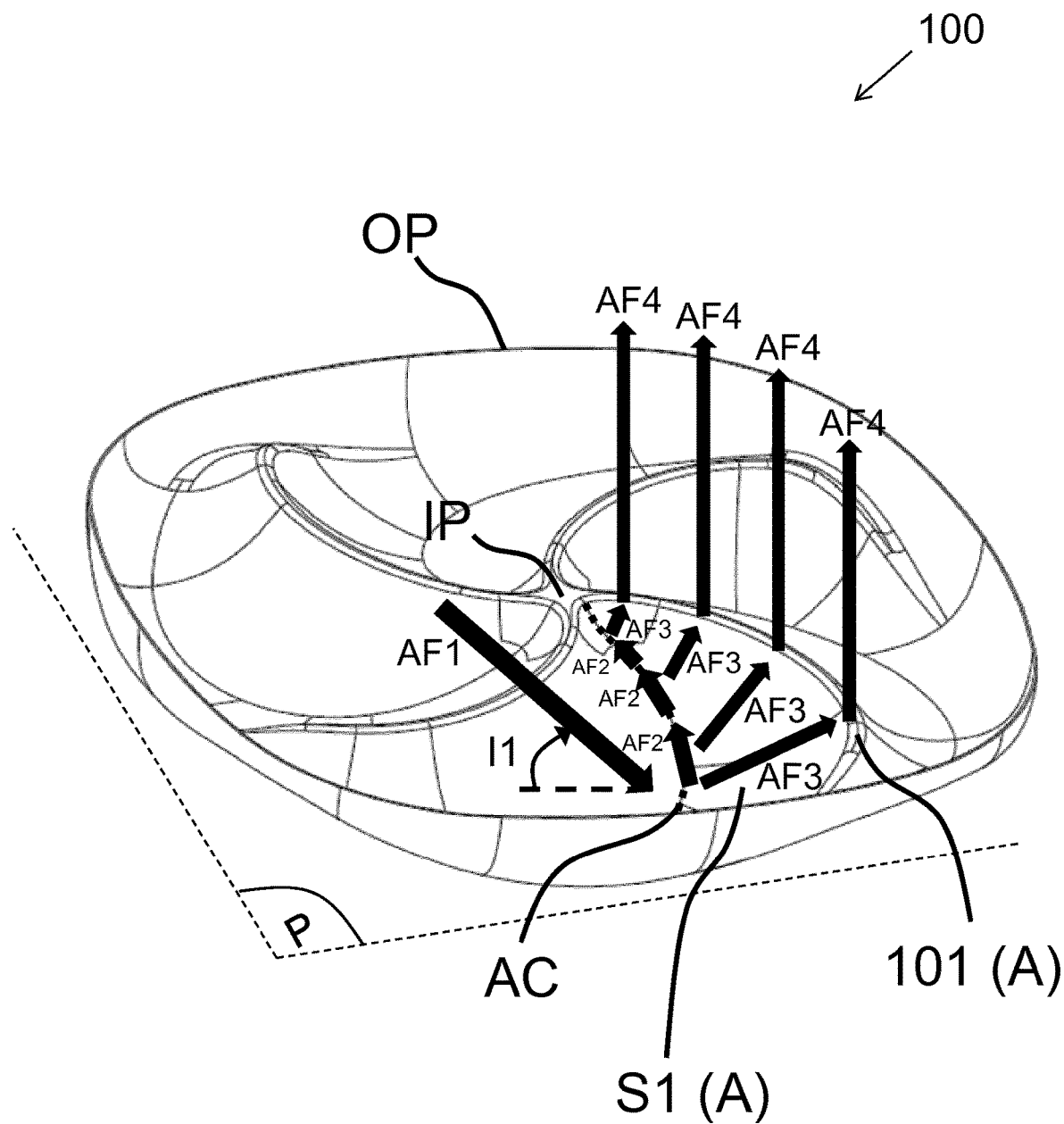
FIG. 2B depicts a three-dimensional view of an air-guide member according to the invention with air flow schematically illustrated.

FIG. 2B depicts a three-dimensional view of an air-guide member according to the invention with air flow schematically illustrated. When an input air flow AF1 directing downwards in a vertical plane (with possible inclination having angle I1 compared to the horizontal plane P and towards the outer part OP of the air-guide member 100, the concave air channel AC allows directing a portion AF2 of the input air flow AF1 towards the inner part IP of the air-guide member 100. As a result, each of the first surface S1 receives air flow components AF3 along its length that can be further redirected upwards thanks to the inclination of the first surface. This results in that not only the air flow is directed upwards, but also that air flowing upwards AF4 is more evenly distributed between the outer part OT and the inner part IP of the air-guide member 100.

Figure 2C:
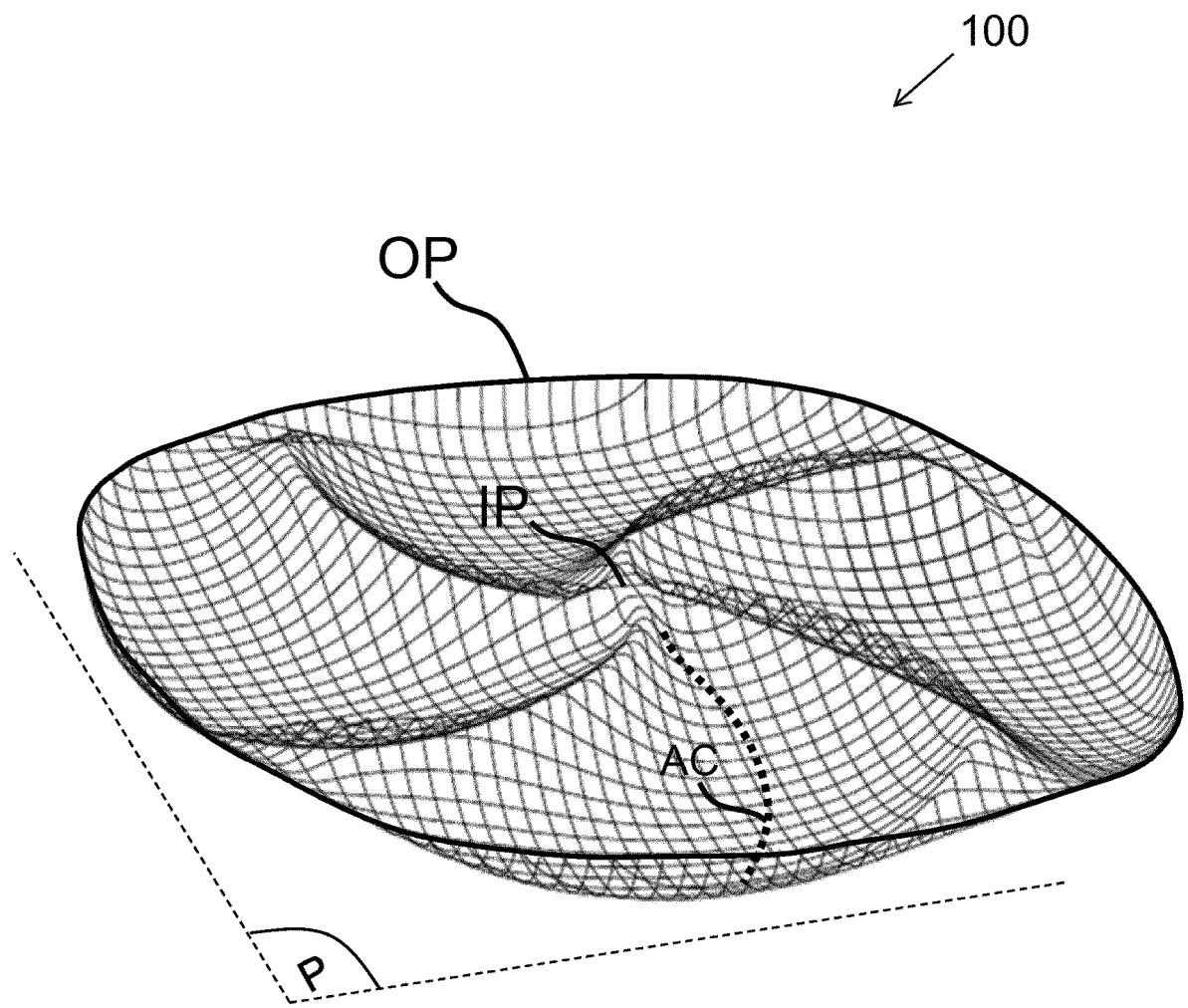
FIG. 2C depicts a three-dimensional view of an air-guide member according to the invention with a meshed-texture representation.

FIG. 2C depicts a three-dimensional view of an air-guide member according to the invention with a meshed-texture representation. This view provides a more detailed representation of the three-dimensional elevation of the air-guide member 100.

Advantageously, the bottom of the concave air channel AC has an elevation H, compared to the horizontal plane P, which varies between the outer part OP and the inner part IP.

Figure 4A:
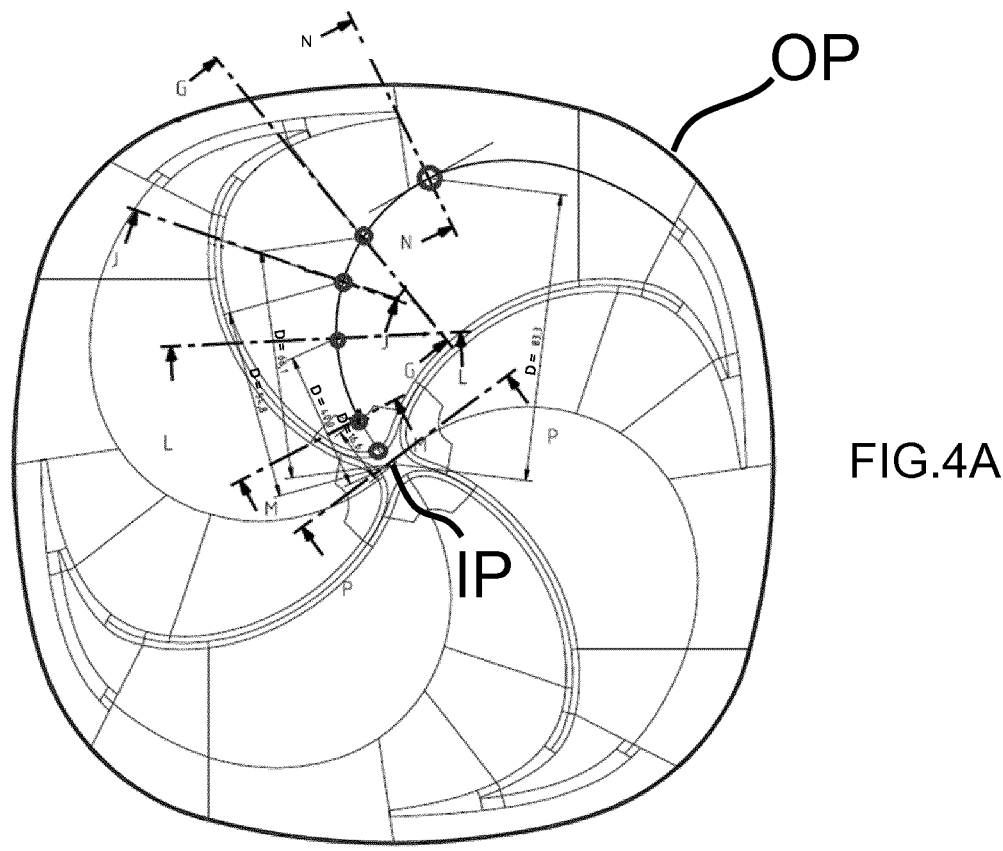
FIG. 4A depicts a top view of an air-guide member according to the invention showing the distance of various points along a concave portion of the air-guide member compared to the inner part of the air-guide member.

FIG. 4A depicts a top view of an air-guide member according to the invention showing the distance D of various points (compared to the inner part IP) along the bottom part of the concave portion AC and the inner part IP of the air-guide member 100.

Figure 4B:
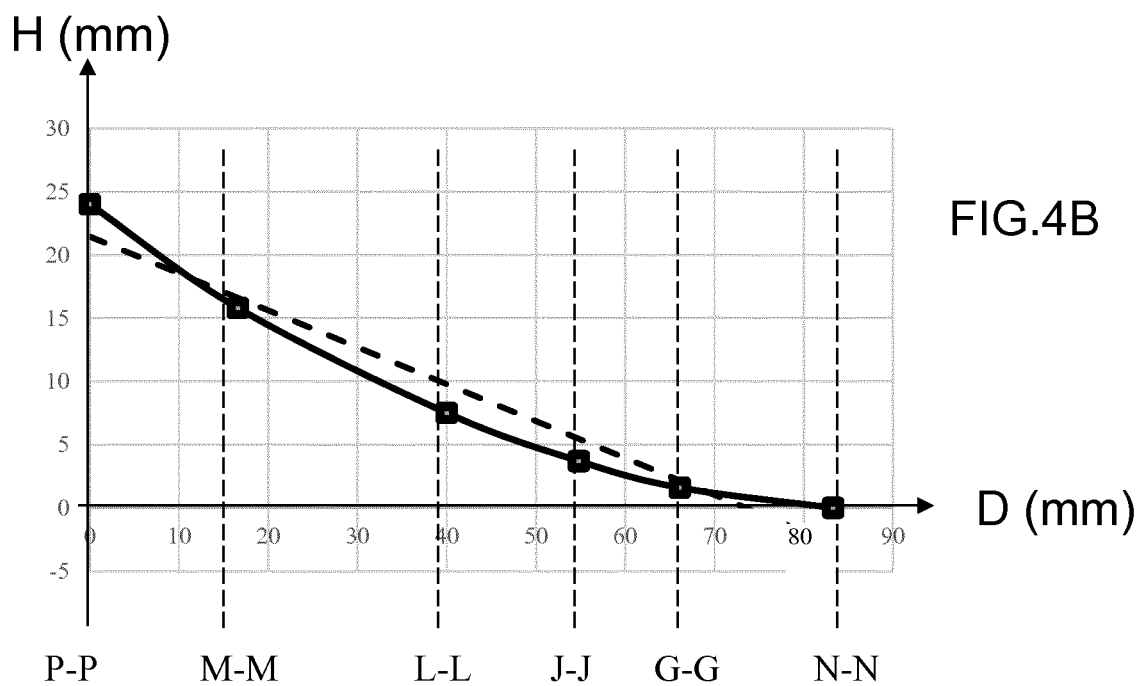
FIG. 4B shows the relation between the distance of various points along a concave portion of the air-guide member according to the invention and the inner part of the air-guide member.

Advantageously, the elevation H increases towards the inner part IP. This characteristic is illustrated by FIG. 4B, which shows an example of a relation between the distance D of those various points and the corresponding elevation H.

Advantageously (not shown), the elevation H decreases towards the inner part IP. For example, the entire length of the concave air channel AC has a decreasing elevation.

Advantageously (not shown), the elevation H increases between the outer part OP and an intermediate area along the concave air channel AC, and decreases between this intermediate area and the inner part IP. For example, the intermediate area is situated at a distance compared to the inner part IP being in the range [10; 50] % of the length L0 between the inner part IP and the outer part OP.

Figure 6:
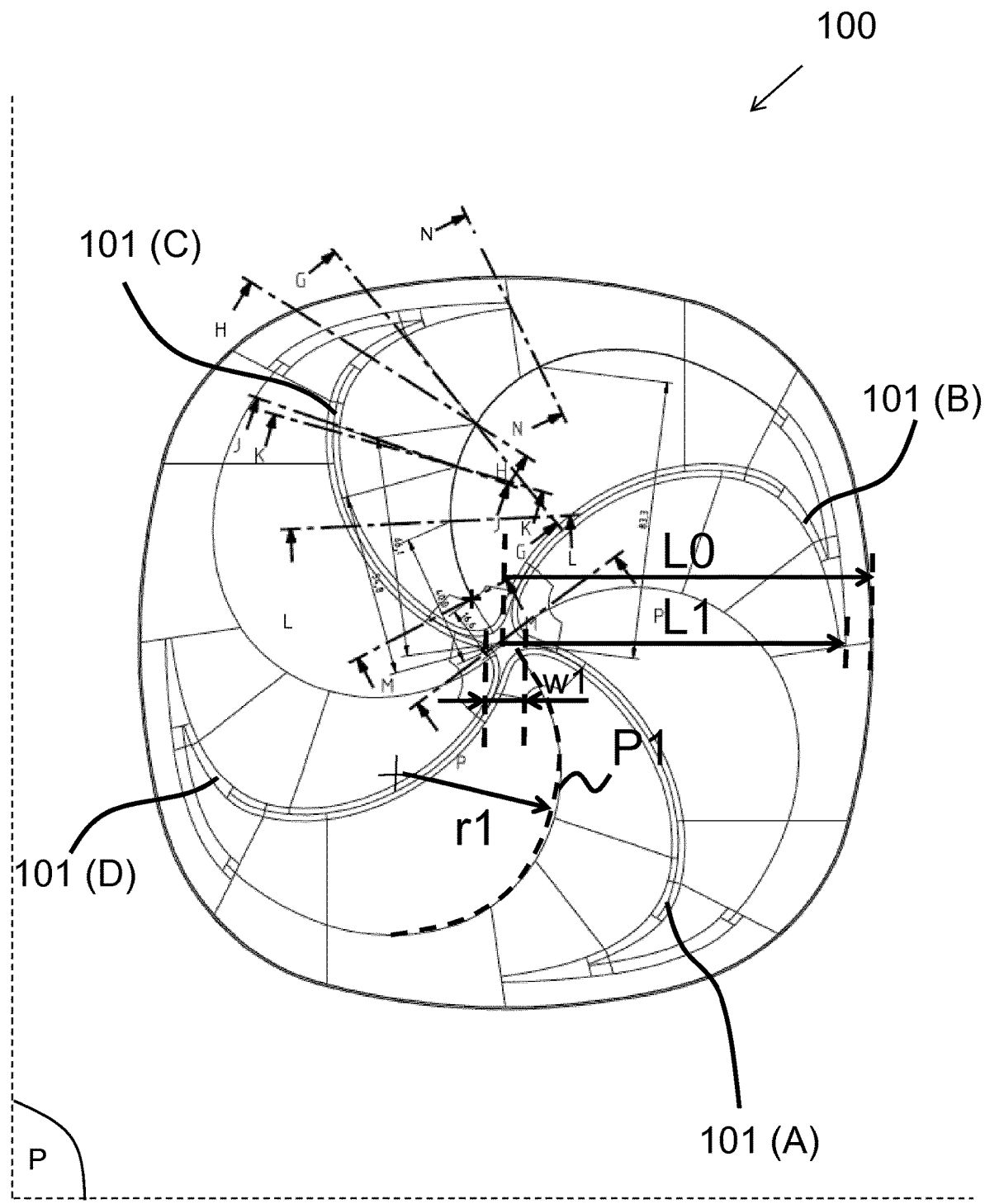
FIG. 6 depicts a top view of an air-guide member according to the invention showing various physical parameters of the air-guide member.

Advantageously, the vertical projection of the bottom part of the concave air channel AC on the horizontal plane P defines a first portion P1 with a circular curvature having a first radius r1 being in the range [30; 100] mm. This characteristic is illustrated on FIG. 6, which depicts a top view of an air-guide member according to the invention showing various physical parameters of the air-guide member.

Figure 3B:
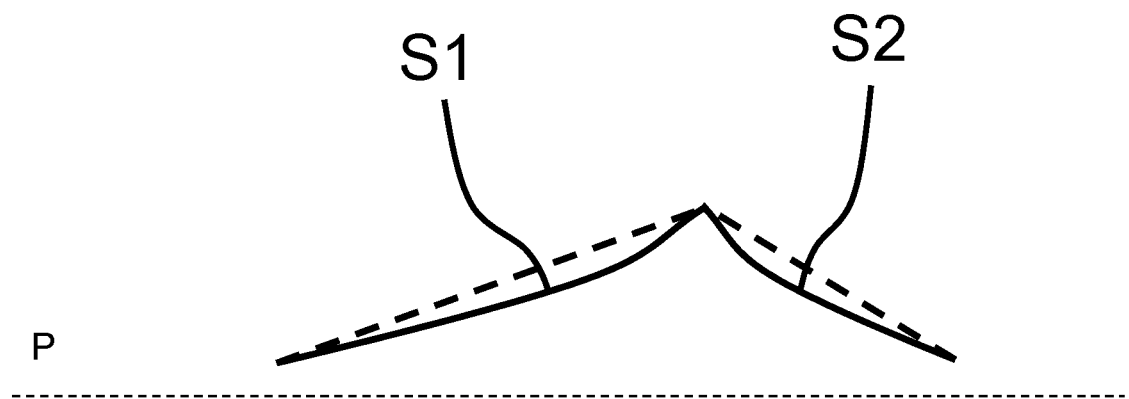
FIG. 3B depicts a vertical cross-section view of a second embodiment of air-deflecting arms used in an air-guide member according to the invention.

Advantageously, the first surface S1 and the second surface S2 have a concave curvature facing opposite the horizontal plane P. This characteristic is illustrated on FIG. 3B, which depicts a vertical cross-section view A-A of a second embodiment of an air-deflecting arms used in an air-guide member according to the invention.

For example, the vertical projection of the bottom part of the concave air channel AC on the horizontal plane P is at equal distance between two consecutive air-deflecting arms 101.

Advantageously, the span L1 of the air-deflecting arms 101 has a value in the range [80; 100]% of the length L0 between the inner part IP and the outer part OP. This characteristic is illustrated on FIG. 6.

Advantageously, the air-deflecting arms 101 converge to the inner part IP to form an upper extremity 105 at the inner part IP having a width w1 in the range [1; 3]% of the length L0 between the inner part IP and the outer part OP. This characteristic is illustrated on FIG. 6 and FIG. 5B (view P-P).

Advantageously, the air-guide member 100 further comprises a curved portion 106 surrounding the periphery of the outer part OP. The curved portion 106 bends circularly upwards with a second radius r2 being in the range [10; 30] mm. This characteristic is in particular illustrated on FIG. 2A, and FIG. 5A (views N-N, G-G, H-H).

Figure 7A:
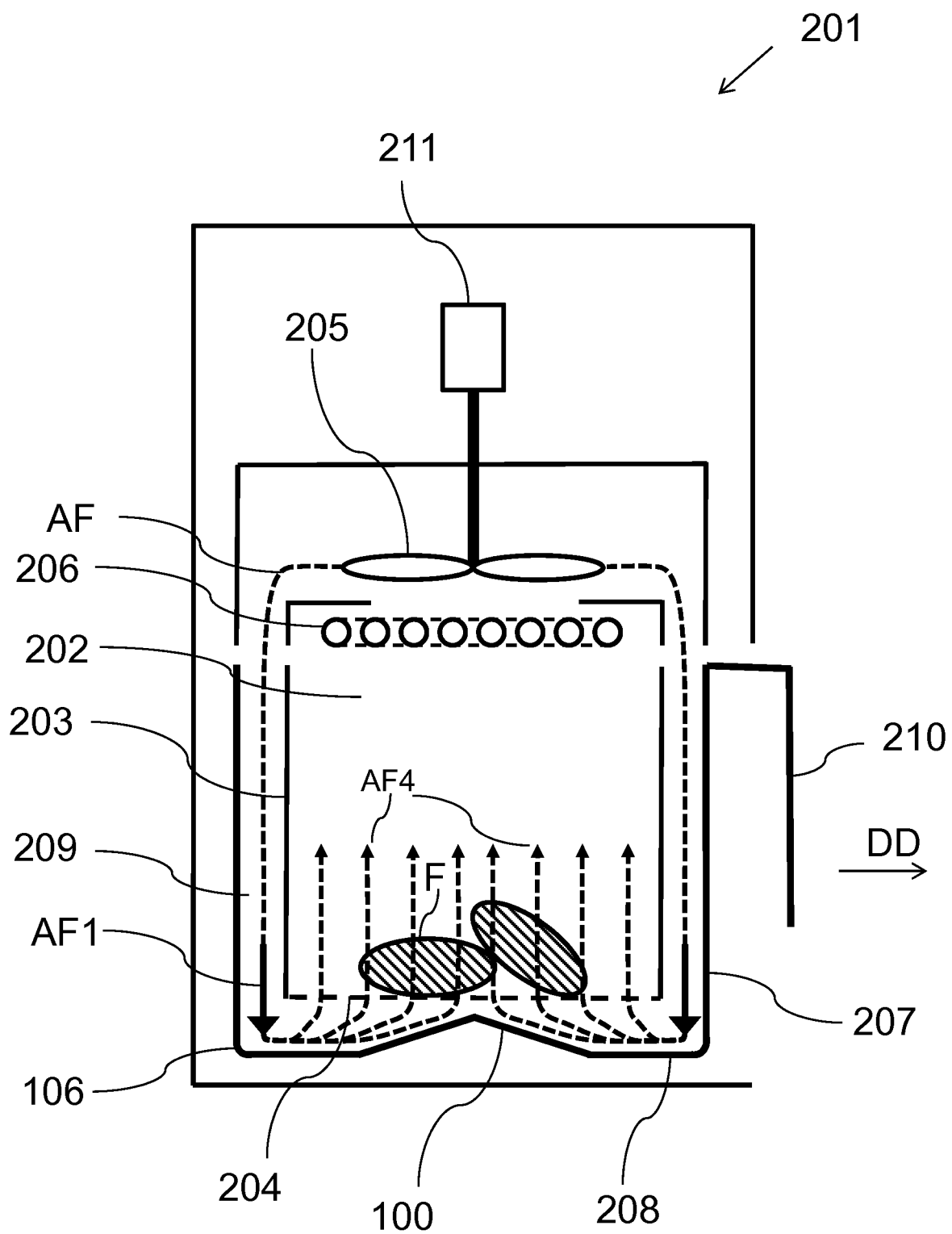
FIG. 7A depicts a first apparatus for preparing food ingredients implementing an air-guide member according to the invention.

FIG. 7A depicts a first apparatus for preparing food ingredients implementing an air-guide member according to the invention. The apparatus 201 comprises a food preparation chamber 202, and a food basket 203 disposed within the food preparation chamber 202 to receive the food ingredients F. The food basket 203 comprises an air-permeable bottom part 204. The apparatus 201 also comprises a fan 205 for circulating an air flow AF inside the apparatus 201, and a heating unit 206 for heating the air flow AF. For example, the fan 205 is geared by motor 211. For example, the air flow is circulated in lateral air channel 209. The apparatus 201 also comprises an air-guide member 100 according to the invention as previously described. The air-guide member 100 is disposed below the air-permeable bottom part 204 for guiding the air flow AF upwards in the food basket 203.

Advantageously, the apparatus 201 further comprises a drawer 207 removably detachable from the food preparation chamber 202. The drawer 207 is adapted to hold the food basket 203 thereinto.

Figure 7B:
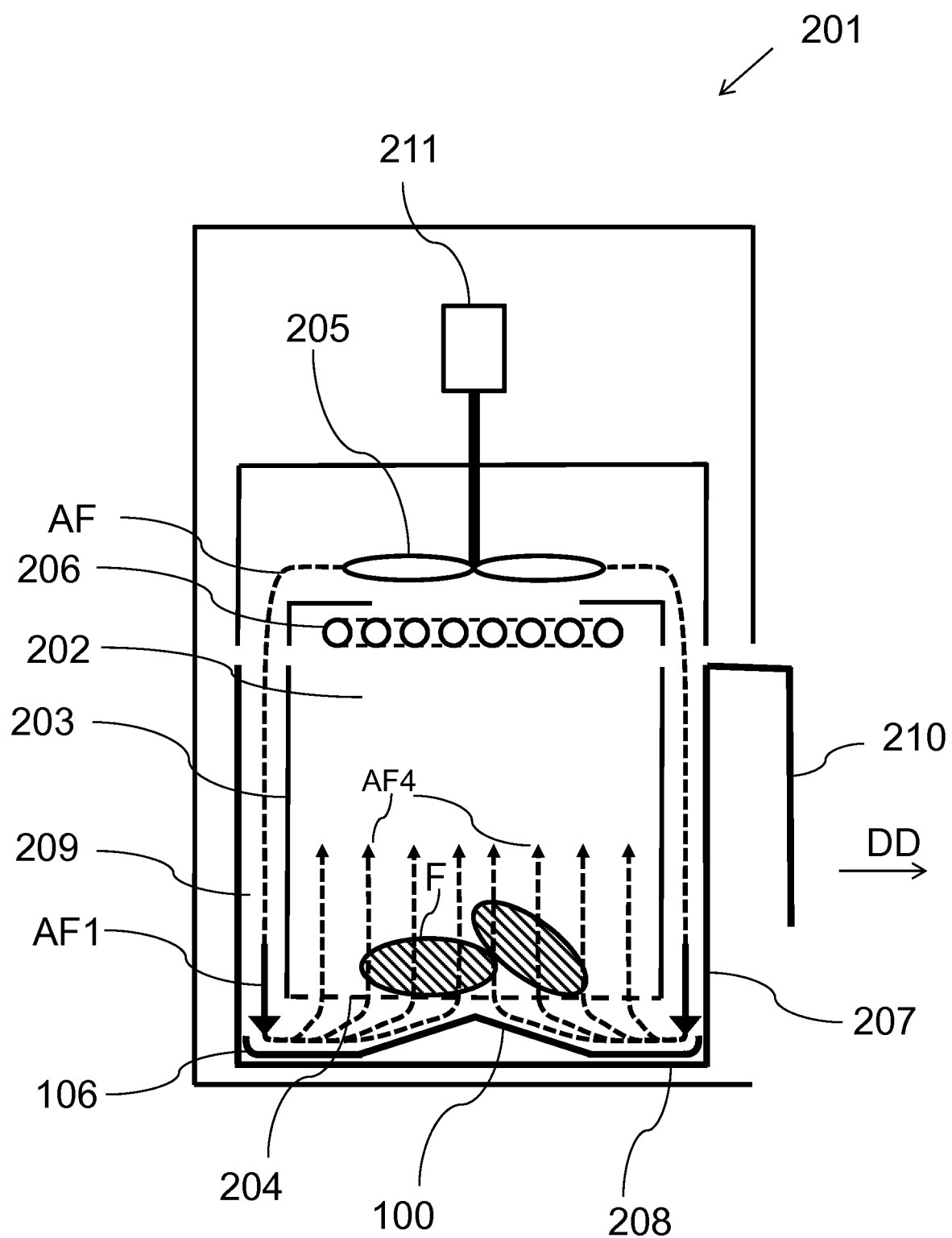
FIG. 7B depicts a second apparatus for preparing food ingredients implementing an air-guide member according to the invention.
Figure 8:
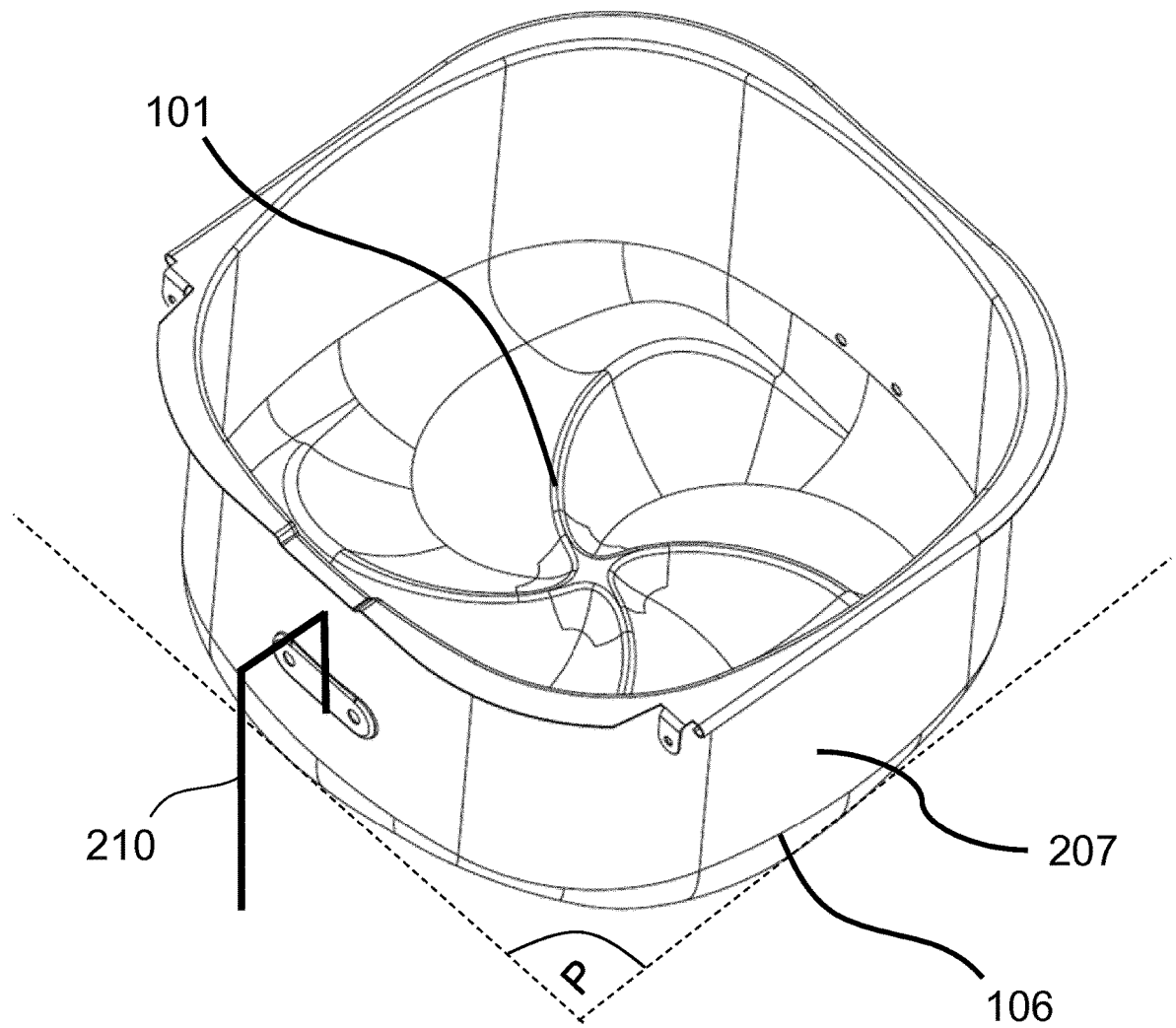
FIG. 8 depicts a three-dimensional view of a drawer used in an apparatus as illustrated in FIG. 7A and FIG. 7B.

FIG. 8 depicts a three-dimensional view of a drawer 207 used in an apparatus as illustrated in FIG. 7A and FIG. 7B.

The drawer 207 may comprise a handle 210 to be pulled out along direction DD by a user.

Advantageously, in a first embodiment illustrated in FIG. 7A, the drawer 207 comprises a bottom part 208 formed by the air-guide member 100.

Advantageously, in a second embodiment illustrated in FIG. 7B, the drawer 207 comprises a bottom part 208 on which the air-guide member 100 is disposed and is removably detachable from.

Advantageously, the drawer 207 has vertical walls abutting tangentially the curved portion 106 of the air-guide member 100. This characteristic is illustrated on FIG. 7A and FIG. 7B.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An air-guide member for guiding an air flow in a food preparation chamber of an apparatus using said air flow to prepare food ingredients, said air-guide member comprising:
    a plurality of air-deflecting arms arranged symmetrically and extending in a horizontal plane between an inner part and an outer part of said air-guide member,
    the air-deflecting arms comprising a first surface being inclined with a positive angle compared to said horizontal plane, and a second surface being inclined with a negative angle compared to said horizontal plane,
    the air-deflecting arms being such that the second surface of a given air-deflecting arm and the first surface of an air-deflecting arm consecutive to said given air-deflecting arms intersect to form a concave air channel extending between said outer part and said inner part.

2. An air-guide member as claimed in claim 1, wherein the bottom part of said concave air channel has an elevation, compared to said horizontal plane, varying between said outer part and said inner part.

3. An air-guide member as claimed in claim 2, wherein said elevation increases towards said inner part.

4. An air-guide member as claimed in claim 2, wherein said elevation decreases towards said inner part.

5. An air-guide member as claimed in claim 2, wherein said elevation increases between said outer part and an intermediate area along the concave air channel, and decreases between said intermediate area and said the inner part.

6. An air-guide member as claimed in claim 1, wherein a vertical projection of the bottom part of said concave air channel on said horizontal plane defines a first portion with a circular curvature having a first radius in the range [30; 100] mm.

7. An air-guide member as claimed in claim 1, wherein said first surface and said second surface have a concave curvature facing opposite said horizontal plane.

8. An air-guide member as claimed in claim 1, wherein the span of said air-deflecting arms has a value in the range [80; 100] % of the length between said inner part and said outer part.

9. An air-guide member as claimed in claim 1, wherein said air-deflecting arms converge to said inner part to form an upper extremity at said inner part having a width in the range [1; 3] % of the length between said inner part and said outer part.

10. An air-guide member as claimed in claim 1, further comprising a curved portion surrounding the periphery of said outer part, said curved portion bending circularly upwards with a second radius being in the range [10; 30] mm.

11. An apparatus as claimed in claim 10, wherein said drawer has vertical walls abutting tangentially said curved portion.

12. An apparatus for preparing food ingredients, said apparatus comprising: a food preparation chamber, a food basket disposed within the food preparation chamber to receive said food ingredients, said food basket comprising an air-permeable bottom part a fan for circulating an air flow inside said apparatus, a heating unit for heating said air flow, an air-guide member as claimed in claim 1, said air-guide member being disposed below said air-permeable bottom part for guiding said air flow upwards in said food basket.

13. An apparatus as claimed in claim 12, further comprising a drawer removably detachable from said food preparation chamber, said drawer being adapted to hold said food basket thereinto, said drawer comprising a bottom part formed by said air-guide member.

14. An apparatus as claimed in claim 12, further comprising a drawer removably detachable from said food preparation chamber, said drawer being adapted to hold said food basket thereinto, said drawer having a bottom part on which said air-guide member is disposed and is removably detachable from.

15. An apparatus for cooking food, wherein the apparatus comprises an air-guide member for guiding an air flow to prepare food ingredients, said air-guide member comprising:
    a plurality of air-deflecting arms arranged symmetrically and extending in a horizontal plane between an inner part and an outer part of said air-guide member,
    the air-deflecting arms comprising a first surface being inclined with a positive angle compared to said horizontal plane, and a second surface being inclined with a negative angle compared to said horizontal plane,
    the air-deflecting arms being such that the second surface of a given air-deflecting arm and the first surface of an air-deflecting arm consecutive to said given air-deflecting arms intersect to form a concave air channel extending between said outer part and said inner part.

16. The apparatus for cooking food of claim 15, wherein the bottom part of said concave air channel has an elevation, compared to said horizontal plane, varying between said outer part and said inner part.

17. The apparatus for cooking food of claim 16, wherein said elevation increases towards said inner part.

18. The apparatus for cooking food of claim 16, wherein said elevation decreases towards said inner part.

19. The apparatus for cooking food of claim 15, wherein said first surface and said second surface have a concave curvature facing opposite said horizontal plane.

20. The apparatus for cooking food of claim 15, further comprising a drawer removably detachable from a food preparation chamber, said drawer being adapted to hold a food basket.

* * * * *